US008336232B2

(12) United States Patent
Patel et al.

(10) Patent No.: US 8,336,232 B2
(45) Date of Patent: Dec. 25, 2012

(54) MULTI-FUNCTION WHEEL LOADER LINKAGE CONTROL WITH OPTIMIZED POWER MANAGEMENT

(75) Inventors: Kalpesh Patel, Romeoville, IL (US); Aleksandar Egelja, Naperville, IL (US); Jiao Zhang, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 182 days.

(21) Appl. No.: 12/877,280

(22) Filed: Sep. 8, 2010

(65) Prior Publication Data

US 2012/0055050 A1 Mar. 8, 2012

(51) Int. Cl.
*E02F 3/43* (2006.01)
*F16D 31/02* (2006.01)

(52) U.S. Cl. .......... 37/348; 60/421

(58) Field of Classification Search .......... 60/421, 60/422, 429, 430, 426, 452, 450, 486; 91/458, 91/468; 37/348, 411; 172/2–11
See application file for complete search history.

(56) References Cited

U.S. PATENT DOCUMENTS

| | | | | |
|---|---|---|---|---|
| 4,800,660 | A | 1/1989 | Masao | |
| 6,170,261 | B1 * | 1/2001 | Ishizaki et al. | 60/421 |
| 6,233,511 | B1 | 5/2001 | Berger et al. | |
| 6,276,133 | B1 * | 8/2001 | Yoshida et al. | 60/421 |
| 6,314,727 | B1 | 11/2001 | Prabhu et al. | |
| 6,427,107 | B1 | 7/2002 | Chiu et al. | |
| 6,651,426 | B2 | 11/2003 | Lange | |
| 7,445,240 | B2 | 11/2008 | Ichimura et al. | |
| 7,520,130 | B2 | 4/2009 | Tanaka et al. | |
| 7,664,586 | B2 | 2/2010 | Ozawa et al. | |
| 2004/0117092 | A1 | 6/2004 | Budde | |
| 2006/0161324 | A1 | 7/2006 | Ozawa et al. | |
| 2007/0240413 | A1 | 10/2007 | Mauch et al. | |
| 2009/0326768 | A1 | 12/2009 | Shull | |
| 2010/0043418 | A1 | 2/2010 | Verkuilen et al. | |

FOREIGN PATENT DOCUMENTS

| | | |
|---|---|---|
| JP | 55-090703 | 7/1980 |
| JP | 09-042205 | 2/1997 |
| JP | 09-119148 | 5/1997 |

* cited by examiner

*Primary Examiner* — Robert Pezzuto
(74) *Attorney, Agent, or Firm* — Miller, Matthias & Hull

(57) ABSTRACT

A hydraulic system for an earth-moving vehicle may include first and second hydraulic cylinders, first and second hydraulic pumps and control valves including a combiner valve to modulate hydraulic fluid and pressure from the first and second hydraulic pumps to the first and second hydraulic cylinders as appropriate for the task being performed. If the task is digging, the first and second cylinders may be associated with tilting and lifting, respectively, and the control valves may be oriented so as to make each pump dedicated to one of the cylinders, and if demand is not being met, to then diminish power to the drivetrain to allow the tilting and lifting to be performed. The combiner valve may or may not be open during this time. If the task is not digging, the combiner valve can be opened to allow for cross-flow between the pumps and the cylinders.

20 Claims, 6 Drawing Sheets

MULTI-FUNCTION WHEEL LOADER LINKAGE CONTROL WITH OPTIMIZED POWER MANAGEMENT

TECHNICAL FIELD

The present disclosure generally relates to hydraulics and, more particularly, relates to control systems for optimizing the use of hydraulic fluid in an earth-moving vehicle.

BACKGROUND

Many earth moving vehicles use pressurized hydraulic fluid as a mechanism for performing work. For example, with a motor grader, an earth-engaging blade downwardly depending from a main frame may be lifted, rotated and tilted using hydraulic cylinders; while with an excavator, a boom arm may be articulated with first and second hinged arms and a bucket at the terminus of the arms, each being associated with a hydraulic cylinder to effect movement.

Another example is a loader. A loader can be of a wheeled or track-type variety and include a lift arm hinged to the loader, with a rotatable bucket or other implement hinged to an end of the lift arm. A lift cylinder may be associated with the lift arm and a tilt cylinder may be associated with the bucket or other implement. When it is desired to lift the arm, hydraulic fluid is directed to the lift cylinder, and when it is desired to rotate the bucket or implement, hydraulic fluid may be directed to the tilt cylinder.

In order to control the tilt and lift cylinders, currently available loaders typically provide a single pump source to direct hydraulic fluid from a tank or reservoir to one of the cylinders in serial fashion. The pumps used can be a fixed displacement type pump, in which case a control valve may be used to regulate the fluid being communicated to the cylinder. Alternatively, the pumps used can be a variable displacement type to enable same.

While effective, such an arrangement is limiting in that the tilt and lift cylinders cannot be independently and simultaneously used for most cases. For example, when digging, the operator would ideally be able to lift and tilt at the same time to facilitate the process. However, currently available loaders prioritize between the lifting and tilting functions, with tilting typically having priority over lifting. As a result, the operator is significantly limited in his or her ability to perform the task at hand, in that the operator has to continuously switch back and forth between using the tilt function and lift function to load the bucket.

SUMMARY OF THE DISCLOSURE

In accordance with one aspect of the disclosure, a loader is disclosed which may comprise a first hydraulic cylinder, a second hydraulic cylinder, a first hydraulic pump operatively associated with the first hydraulic cylinder, a second hydraulic pump operatively associated with the second hydraulic cylinder, and a combiner valve adapted to allow and disallow fluid communication between the first pump and the second hydraulic cylinder and between the second pump and first hydraulic cylinder.

In accordance with another aspect of the disclosure, an earth moving vehicle is disclosed which may comprise a chassis, an engine supported on the chassis, a locomotive undercarriage supporting the chassis, a first hydraulic cylinder connected to a first work implement of the vehicle, a second hydraulic cylinder connected to a second work implement of the vehicle, a first hydraulic pump operatively associated with the first hydraulic cylinder, a second hydraulic pump operatively associated with the second hydraulic cylinder, and a combiner valve adapted to allow and disallow fluid communication between the first pump and the second hydraulic cylinder and between the second pump and first hydraulic cylinder.

In accordance with another aspect of the disclosure, a method of controlling a hydraulic system is disclosed, which may comprise providing a lift hydraulic pump, providing a tilt hydraulic pump, calculating whether a digging function is being performed, and dedicating flow from the lift pump to a lift cylinder and from a tilt pump to a tilt cylinder when it is determined that the digging function is being performed.

These and other aspects and features of the disclosure will be more readily understood upon reading the following detailed description when taken in conjunction with the accompanying drawings.

DETAILED DESCRIPTION

Figure 1:
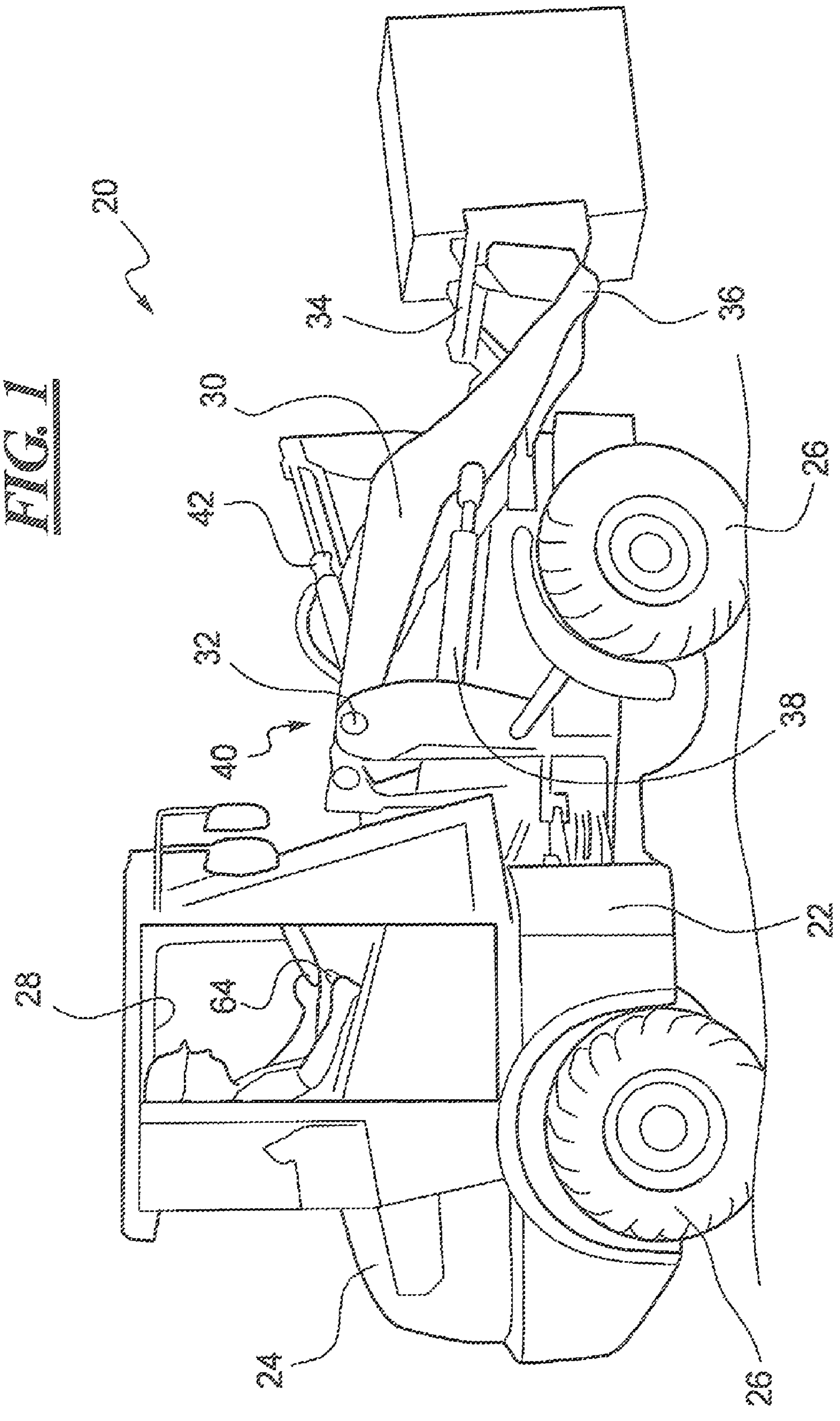
FIG. 1 is a perspective view of a loader constructed in accordance with the teachings of the disclosure.

Referring now to the drawings, and with specific reference to FIG. 1, an earth-moving vehicle constructed in accordance with the teachings of this disclosure is generally referred to by reference numeral 20. While the earth-moving vehicle is depicted as a wheel loader, it is to be understood that the teachings of this disclosure apply with equal efficacy to many other earth moving vehicles including, but not limited to, track-type loaders, excavators, motor graders, skid steers, compactors, scrapers, pipelayers, rippers, and the like.

As shown in the exemplary embodiment, however, the loader 20 may include a chassis 22 supporting an engine 24, and being supported by wheels 26. The chassis 22 may also support an operator station 28, and a lift arm (or pair of lift arms) 30 hinged to the chassis 22 at pivot 32. A bucket (or other implement) 34 may be provided at a distal end 36 of the lift arm 30. While not depicted, it is to be understood that an array of implements with such a loader 20 are possible including, but not limited to, blades, forks, and multiple varieties of buckets such as toothed buckets, ejector buckets, side dump buckets, demolition buckets, and the like.

In order to raise and lower the lift arm 30, a lift cylinder 38 may operatively connect the chassis 22 to the lift arm 30. Typically, a lift cylinder 38 is provided for each lift arm 30. The lift cylinder 38 is a hydraulic cylinder connected to the hydraulic system 40 of the loader 20 as will be described in further detail herein. Similarly, in order to rotate the bucket 34 relative to the lift arm 30, one or more tilt cylinders 42 may operatively connect the bucket 34 to the chassis 22. Again, the lift cylinder 42 is connected to the hydraulic system 40 of the loader 20 as will be described in further detail herein.

Figure 2:
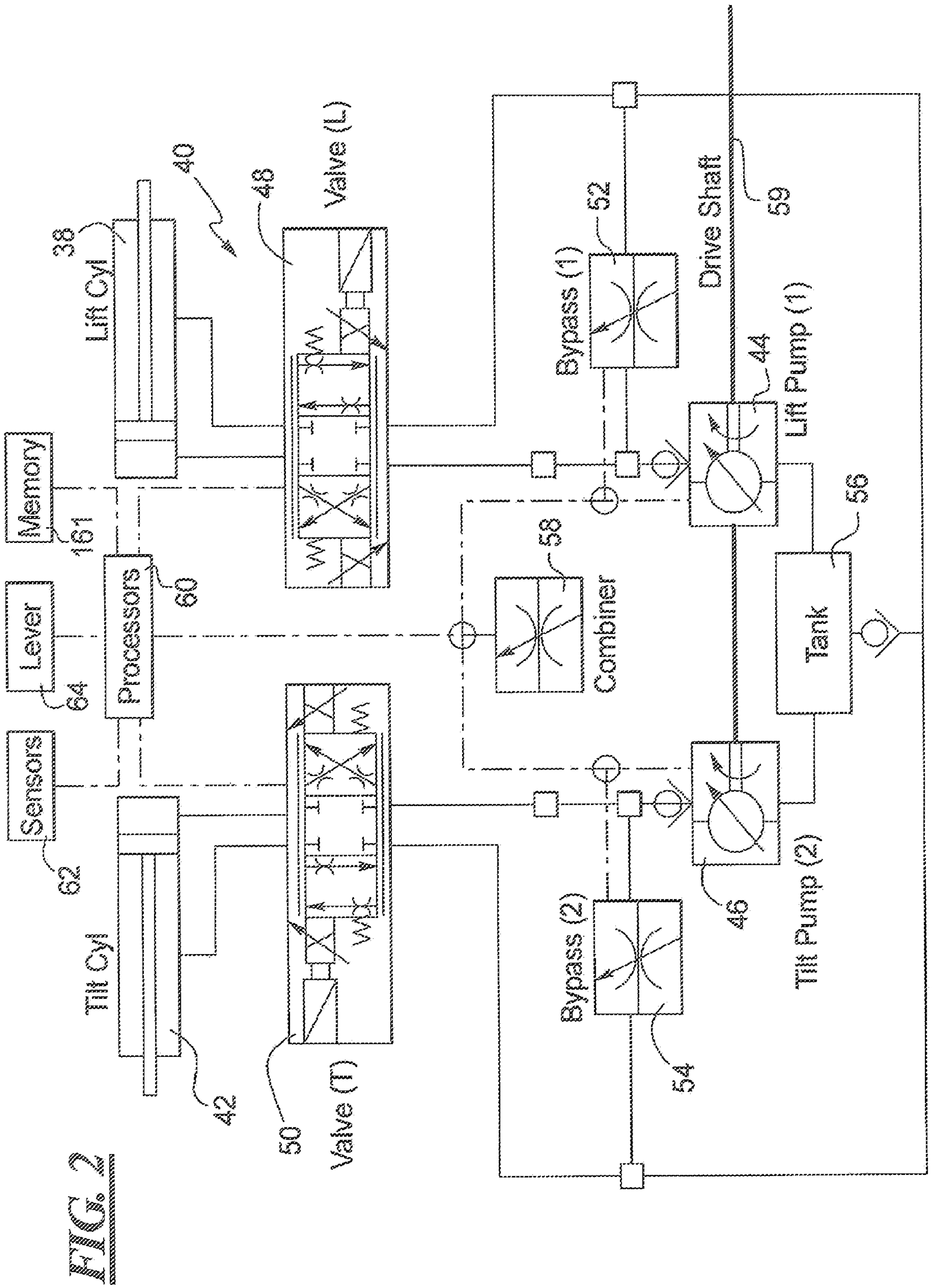
FIG. 2 is a schematic of a hydraulic control system constructed in accordance with the teachings of the disclosure.

As indicated above, the prior art typically directs hydraulic fluid to tilt and lift cylinders from a single pump source in serial fashion, thus limiting the operator. This slows productivity and requires significant dexterity and manual proficiency on the part of the operator. However, in this regard the present disclosure provides a significant improvement. Referring now to FIG. 2, the hydraulic system 40 is shown in detail. The hydraulic system 40 includes the aforementioned lift cylinders 38 and tilt cylinders 42. In addition, a combination of dedicated valves and pumps connect to the cylinders to optimize performance. More specifically, a lift pump 44 may be primarily dedicated to, and operatively connected to, the lift cylinder 38, and a tilt pump 46 may be primarily dedicated to, and be operatively connected to, the tilt cylinder 42. In addition, a lift control valve 48 may be provided between the lift pump 44 and lift cylinder 38 to regulate the flow of hydraulic fluid from the lift pump 44 to the lift cylinder 38 and back from the lift cylinder 38 to a tank as will be described in further detail herein. Similarly, a tilt control valve 50 may be provided between the tilt pump 46 and the tilt cylinder 42.

The pumps 44 and 46 may either be provided as fixed displacement pumps wherein the associated control valves entirely regulate flow to the cylinders, or as variable displacement pumps wherein the associated control valves work in conjunction with the variable rate at which the pumps operate to control flow. The hydraulic system 40 may also include a lift bypass valve 52 and a tilt bypass valve 54 to enable the fluid exiting the pumps 44 and 46 to return to a tank, reservoir or sump 56 of the hydraulic system 20 when the control valves 48 and 50 are in neutral.

So as to allow the pumps 44 and 46 to work in tandem when need be, a combiner valve 58 may also be provided as part of the hydraulic system 40. The combiner valve 58 allows hydraulic fluid from the lift pump 44 to be communicated to the tilt cylinder 42, and hydraulic fluid from the tilt pump 46 to be communicated to the lift cylinder 38. The combiner valve 58 also is able to completely separate the lift function from the tilt function by disallowing such communication between the lift pump 44 and the tilt cylinder 42, and the tilt pump 46 and the lift cylinder 38, and only allowing the lift pump 44 to communicate to the lift cylinder 38 and the tilt pump 46 to only communicate fluid to the tilt cylinder 42. Moreover, as the combiner valve 58 is modulated, any combination between fully separated and fully cooperating is possible as well.

A significance of this last mentioned feature is that when the loader 20 is performing a function such as digging or loading, the hydraulic system 40 of the present disclosure allows for simultaneous and dedicated use of both cylinders. This is accomplished by, among other things, providing separation of the pumps and control valves for each of the tilt and lift cylinders. Also of importance, as will be described in further detail herein, the hydraulic system 40 together with the control algorithm manages use of the available hydraulic power of the system 40 and optimizes use of same to most efficiently and effectively perform the task at hand. This management involves not only the optimal use of one or both of the pumps 44 and 46, but the available hydraulic power of the vehicle drivetrain 59. As used herein, the drivetrain 59 is to be understood to include the system, apparatus, and structure enabling locomotion of the vehicle.

In order to do so, the hydraulic system 40 includes a processor 60. The processor 60 may be provided as part of a larger computing unit or processor of the engine 24 or loader 20, or can be a dedicated processor solely involved with the hydraulic system 40. The processor 60 may receive signals indicative of the tasks being called for, calculate the appropriate prioritization and combination schedule to optimize performance, and then generate signals to one or more of the pumps, control valves, and combiner valve to cause that performance. The processor 60 may receive signals from various sensors 62 provided as part of the hydraulic system such as, but not limited to, levers, control knobs and other input devices provided as part of the operator station 28 and as part of the hydraulic system 40. For example, the operator station 28 may include separate levers 64 for moving the lift cylinder 28 and the tilt cylinder 32, and the sensors 62 may monitor the positions of such levers 64, or electrical characteristics generated by movement of such levers, hydraulic pressures within the cylinders, or the like.

Figure 3:
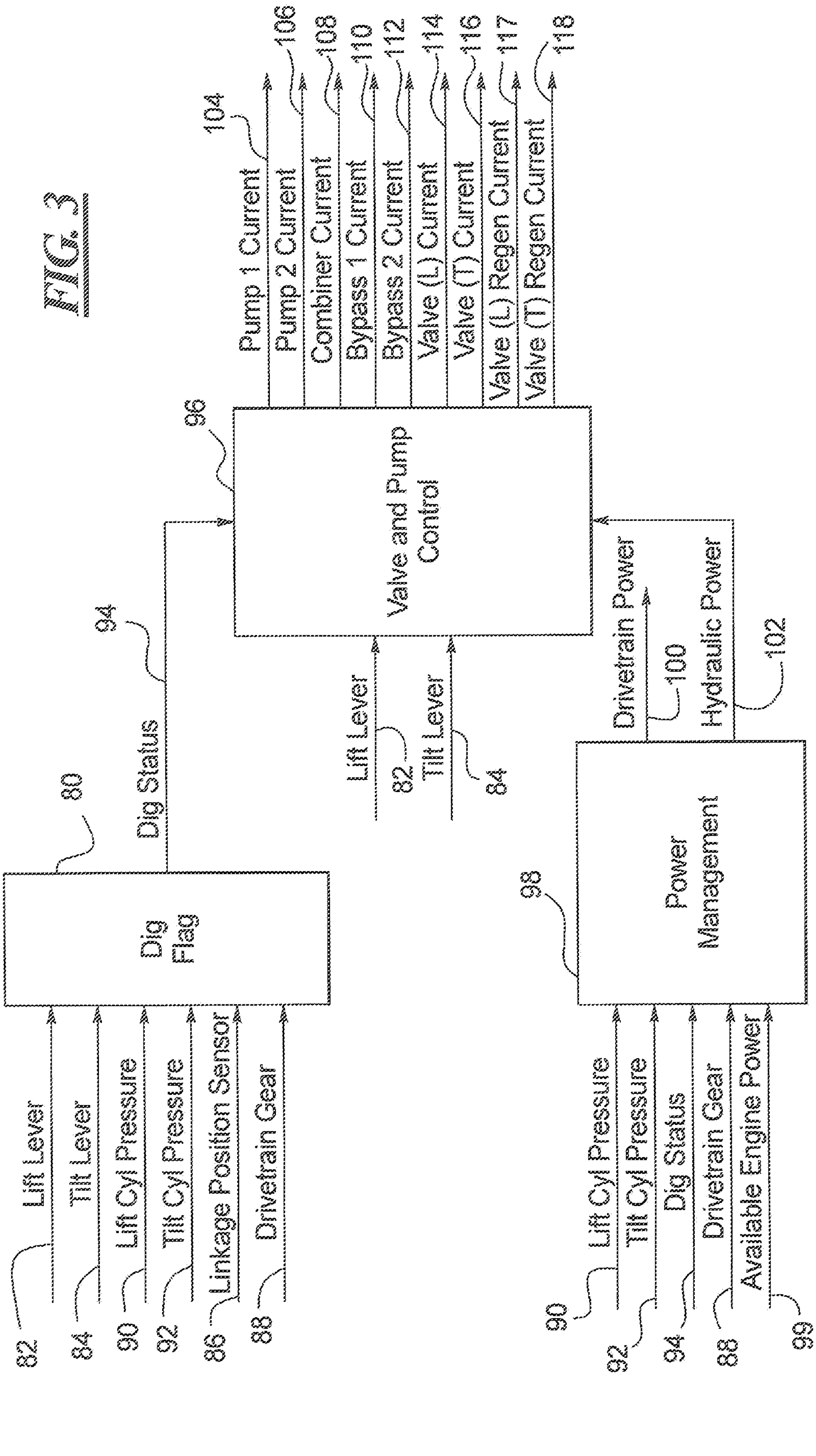
FIG. 3 is a schematic of the vehicle control logic which may be employed by a processor of the disclosed system.

Referring now to FIG. 3, the logic which may be employed by the processor 60 is shown in schematic format. As stated above, when the loader is in a dig or loading function the combiner valve 58 is moved to either a fully closed position or a modulated position as conditions warrant so as to dedicate the lift pump and the tilt pump to the lift cylinder and to the tilt cylinder. In so doing, the lift and tilt cylinders can be used simultaneously and the digging/loading function can be most advantageously performed. In order to determine when the digging/loading function is being performed, the processor 60 may employ a dig flag algorithm 80 which uses a number of inputs to determine if the digging/loading is being performed. Those inputs as shown in FIG. 3 could include feedback with respect to the position of the lift lever 82, the position of the tilt lever 84, the position of the linkage sensor 86, signal 88 indicating the gear in which the drivetrain 59 of the vehicle 20 is engaged, signal 90 indicating the pressure within the lift cylinder 38, and signal 92 indicating the pressure within the tilt cylinder 42. Based on these inputs, and others which may or may not be employed, the algorithm 80 can then determine if the digging function is being performed, and transmit a corresponding signal 94 to valve and pump control algorithm 96.

However, for the valve and pump control algorithm 96 to make its decision, it may be necessary that the drivetrain power management algorithm 98 send some inputs. Again, as shown in FIG. 3, this algorithm 98 may employ input from the lift cylinder pressure sensor 90, the tilt cylinder pressure sensor 92, the determined dig flag algorithm output signal 94, the drivetrain gear signal 88, and a signal 99 corresponding to the engine power available for use. The drivetrain power management algorithm 98 then outputs a first signal 100 with respect to the drivetrain power available and a second signal 102 with respect to the hydraulic power available. Hydraulic power signal 102 is then used as an input along with the dig flag algorithm output signal 94 to the valve and pump control algorithm 96. This is in combination with the position of the lift lever 82 and the position of the tilt lever 84 also being used as inputs to the valve and pump control algorithm 96. Based on all those inputs, signals are then generated by the valve and/or pump control algorithm 96 to set the lift pump flow output signal 104, the tilt pump flow output signal 106, the combiner valve position output signal 108, the lift bypass valve flow output signal 110, the tilt bypass valve flow output signal 112, the lift control valve flow output signal 114, the tilt control valve flow output signal 116, the lift control valve regeneration flow output signal 117, and the tilt control valve regeneration flow output signal 118.

Figure 4:
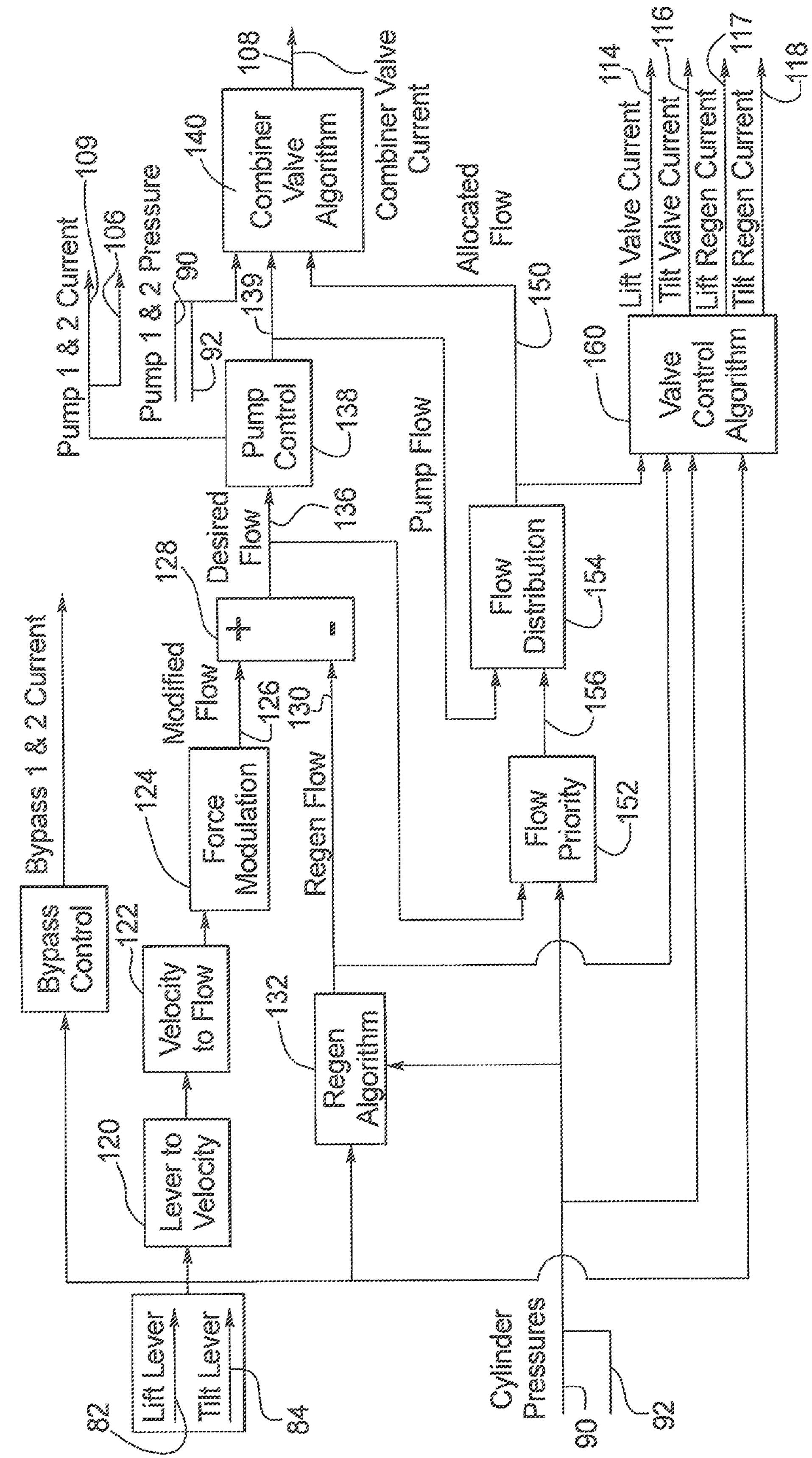
FIG. 4 is a schematic of the valve and pump control logic which may be employed by the disclosed system.

A more detailed description of the valve and pump control logic algorithm 96 is provided in FIG. 4. As shown therein, the lift and tilt lever positions as represented by signals 82 and 84 are still shown as inputs to the control logic. In addition, the tilt and lift cylinder pressures 90 and 92 are also shown on the left hand side of the logic diagram. However, the valve and pump control logic of FIG. 4 also shows that force modulation and the resulting modified flow therefrom are factored into the calculations, as well as the available hydraulic fluid in terms of regeneration, and the flow priority and distribution as will be described in further detail herein.

Starting with the calculation of the force modulation, it will be seen in the upper left hand corner of FIG. 4 that the valve and lift lever positions 82 and 84 are used to first map the sensed lever positions to the corresponding cylinder velocities. This is shown in box 120 of FIG. 4. Such mapping can be implemented in terms of a software module, lookup table or the like. Once the cylinder velocity is calculated, that cylinder velocity is then mapped to hydraulic fluid flow as indicated by box 122 of FIG. 4. Based on the calculated hydraulic fluid flow of box 122, the force modulation is then calculated as shown by box 124. The force modulation is the modified flow request based on the pressure to create similar performance to an open-center valve system. At higher pressures, the cylinder flow is reduced to the same lever input.

The force modulation box 124 then outputs a modified flow signal 126 which is fed to a summing function 128. The summing function 128 uses, in combination with the modified flow signal 126, the regeneration flow signal 130 as also indicated in FIG. 4. The regeneration flow signal 130 is an output from a regeneration algorithm 132, also run by the software of the system. The regeneration algorithm 132 takes into account the pressurized hydraulic fluid remaining within the cylinders after a previous motion or activity. That pressurized fluid can of course then be used for further functions and is thus fed to the summing junction 130 as indicated above.

Based upon the combination of the modified flow and the regeneration flow, a desired flow signal 136 is then calculated which is fed into a pump control module 138. The pump control module 138 then generates the tilt and lift current flow signals 104 and 106 as indicated in FIGS. 3 and 4 and described above. In addition, the pump control module 138 also generates an output signal 139 that is then used as an input to the combiner valve algorithm 140. The combiner valve algorithm 140 also uses the pressure signals from the tilt and valve pumps as inputs as indicated by signals 90 and 92. Ultimately, the combiner valve algorithm 140 calculates and outputs the aforementioned combiner valve position output signal 108.

A further input to the combiner valve algorithm 140 is the allocated flow signal 150 as determined by flow priority logic 152 and flow distribution logic 154. More specifically, after the summing junction 130 calculates the desired flow 136, the disclosed system does not simply generate signals to the pump control module 138 and combiner valve control module 140 but rather also take into account the priority of the various desired flows. Accordingly, based on the desired flow output 136 from the summing junction 130 and the pressures 90, 92 within the tilt and lift cylinders, the flow priority 152 for the tilt and lift cylinders is then calculated and used as output 156 to the flow distribution logic module 154. The flow distribution logic module 154 also then takes into account the output signal 139 from the pump control algorithm 138 and generates allocated flow output signal 150 to the combiner valve algorithm 140.

In combination with the output 150 to the combiner valve algorithm 140, the allocated flow signal 150 is also used as an input to the valve control algorithm 160. The valve control algorithm 160 also takes into account the regeneration flow signal 130, the cylinder pressures 90, 92, and the lift and tilt lever positions 82, 84. The valve control algorithm 140 then generates the aforementioned lift valve current signal 114, tilt valve current signal 116, lift valve regenerator current signal 117, and tilt valve regenerator current signal 118.

In operation, it can therefore be seen that the present invention sets forth an apparatus and method for optimizing use of the available hydraulic power of the hydraulic system 40 to thereby enable multiple hydraulic functions, such as lifting and tilting, to be performed simultaneously. The flowcharts of FIGS. 5 and 6 represent one sample sequence of steps that may be practiced in accordance with the teachings of this disclosure, and by software stored on a memory 161 working in conjunction with the processor 60.

As a first step, based on tilt and lift lever input 200, the method may inquire whether the digging/loading algorithm has indicated that a digging sequence has begun as indicated by query 202. If the answer to this is yes, bypass valves 52 and 54 are appropriately positioned as shown by a step 204, the combiner valve 58 is appropriately positioned as indicated in a step 206, the lift control valve 48 is controlled based on the lift lever input as indicated by a step 208, and the tilt control valve 50 is controlled based on the tilt lever input as indicated by a step 210. Once each of these steps are performed, the tilt lift pumps and control valves are fully dedicated to the respective tilt and lift cylinders and thus the operator is able to simultaneously use both. This may allow the lift and tilt pumps to operate at different pressure levels (if the cylinder loads are different) and therefore save energy.

However, this process is continually monitored and as indicated in a step 212, a next step in the method is to determine whether the pressures within the lift and tilt cylinders are greater than a predetermined threshold. If the software determines that the answer to this inquiry is no, the method maintains lift and tilt valve positions as indicated by a step 214. However, if step 212 determines that the pressures within the tilt and/or lift cylinders are indeed greater than the predetermined threshold a step 215 is performed wherein hydraulic power to the drivetrain is reduced so as to allow the tilt and/or lift cylinder pressures to in turn be reduced and thus allow the cylinders to continue to move and to allow the operator to continue to dig.

Figure 5:
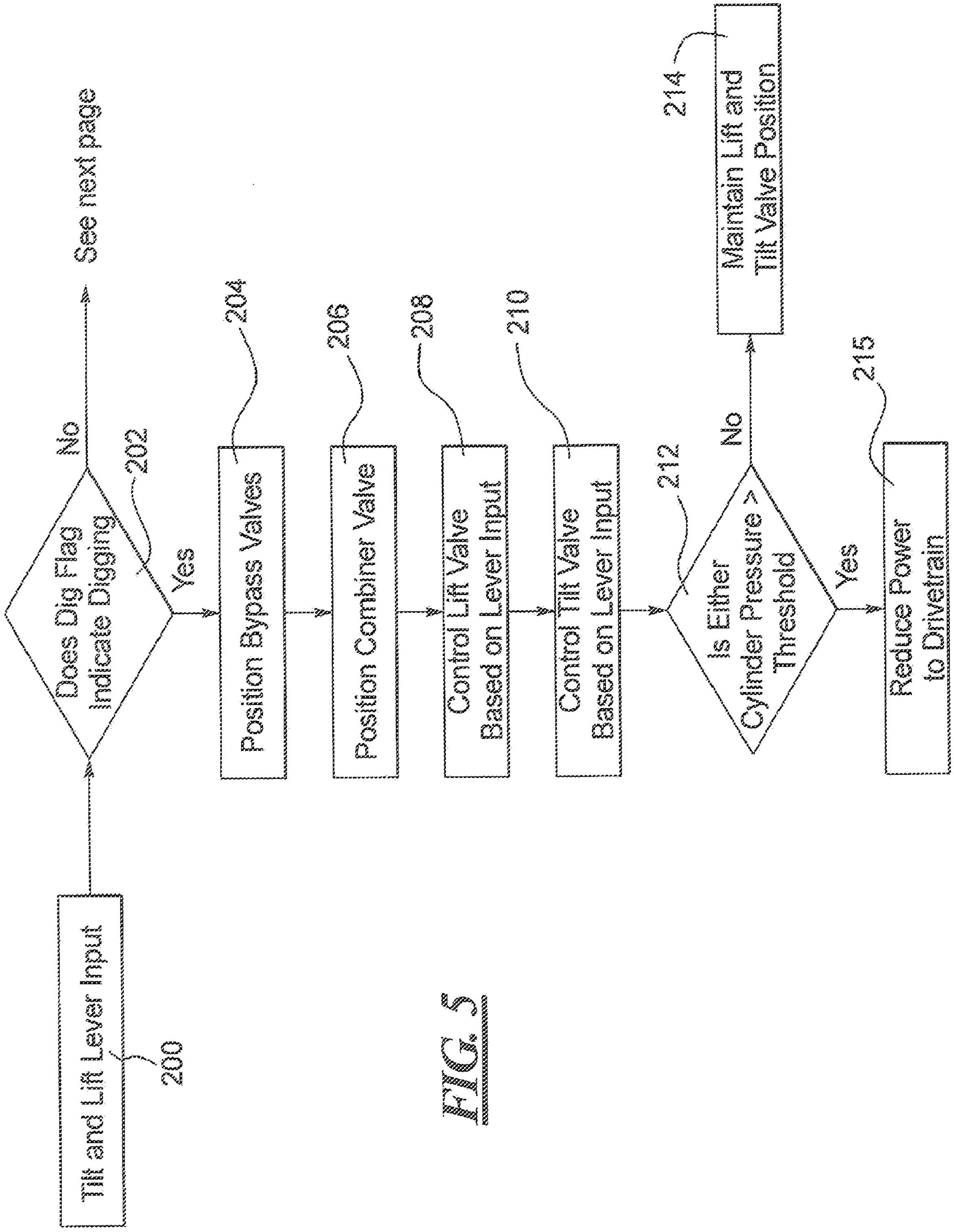
FIG. 5 is a flowchart depicting a sample sequence of steps which may be practiced in accordance with the teachings of the disclosure.
Figure 6:
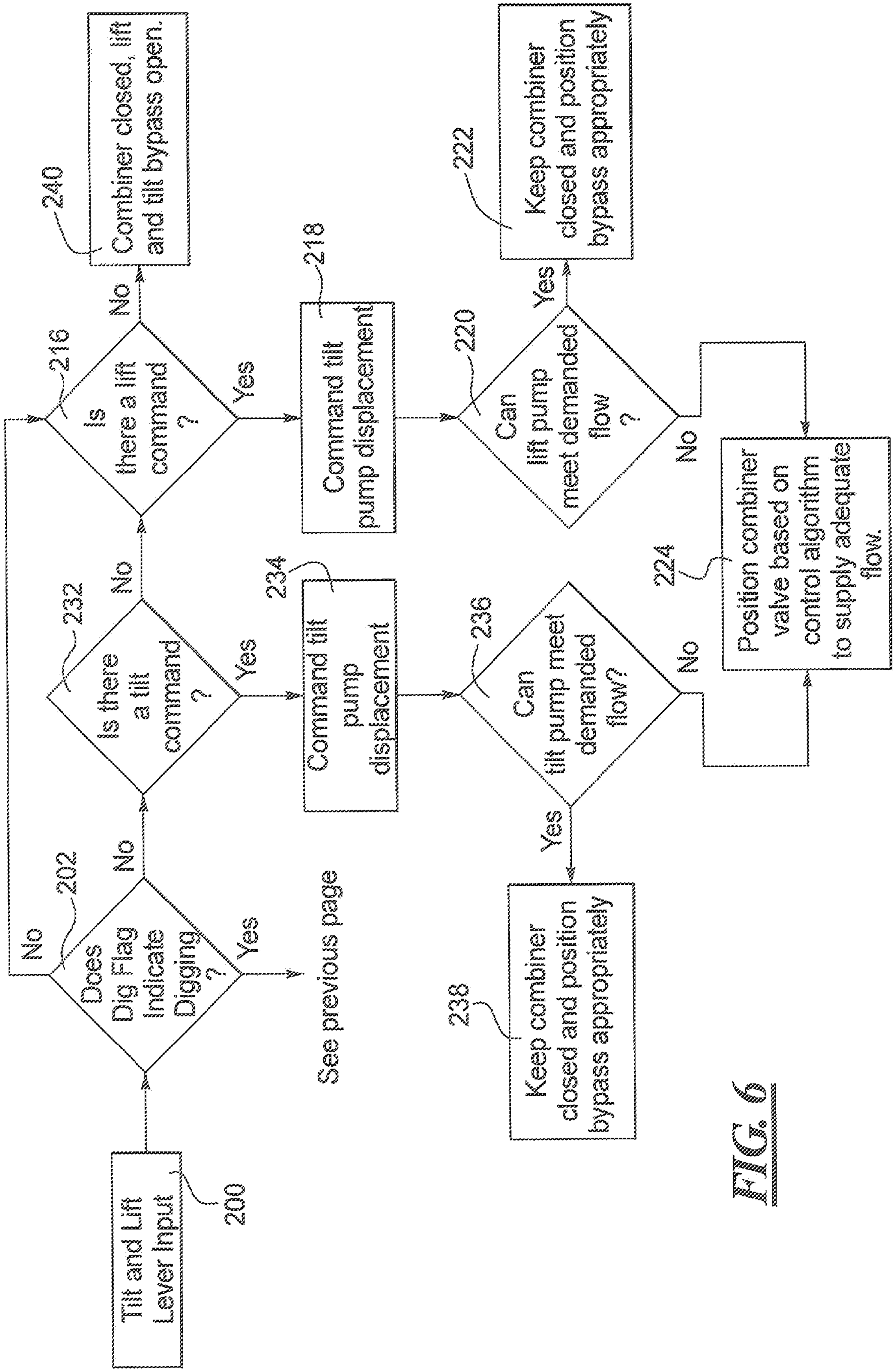
FIG. 6 is a flowchart in continuation of the flowchart of FIG. 5.

Completing the flowchart of FIG. 5, it can be seen from FIG. 6 that if the initial inquiry 202 determines that the digging sequence is not being performed, the method then moves on to determine if the combiner valve 58 should be used. In so doing the combiner valve 58 may open sufficiently to allow cross-flow between the tilt and lift pumps and the tilt and lift cylinders respectfully as will be described in further detail herein. For example, if the digging/loading algorithm determines that digging is not being performed, the loader 20 may be engaged in other operations such as simply lifting the filled bucket 34 so as to be dumped in a different location, into a dump truck, or the like. In such a situation, it may be desirable to simply lift the arms of the loader 20 without tilting the bucket 34. It may therefore be advantageous to direct the output of the tilt pump 46 to assist the lift pump 44 in lifting the load. Once the arm 30 is lifted to a sufficient height to allow the dumping, the lift feature will no longer be called upon, but the tilt feature will be called upon so as to dump the bucket in the receiving truck. In order to assist with this tilting function, the output of the lift pump 44 may be fully or partially directed to assist the tilt pump 46. In so doing, the overall operation of the loader 20 can be optimized and productivity can be improved.

In terms of the flowchart of FIG. 6, a next step at that point may be to determine if the lifting function is being commanded as shown by a step 216. If so, a step 218 shows that the processor 60 may then direct the lift pump 44 to be solely dedicated to the lift cylinder 38, and thereafter determine if the lift pump is able to meet the lift cylinder demand as shown in step 220. If yes, the combiner valve is maintained in a closed position, and the bypass valve is appropriately positioned as shown by a step 222. If not, the combiner valve 58 is positioned to allow some or all of the hydraulic fluid generated by the tilt pump 46 to be directed to assist the lift cylinder 38 as well as indicated by a step 224. If the tilt cylinder assistance is still not enough to meet demand as determined, the hydraulic power directed to the drivetrain can be reduced and redirected to the lift cylinder. Conversely, if it is sufficient, valve positions are maintained.

At the same time that it is being determined whether a lift function is being commanded, the method may also determine whether a tilt function is being called upon as determined by the step 232. In that event, step 234 dictates that the tilt pump 46 dedicates a sufficient level of its output of hydraulic fluid to the tilt cylinder 42 to accomplish the desired task. If the entire output of the tilt pump 46 is not sufficient to accomplish the required motion as determined by step 236, some or all of the output of the lift pump 44 can also be used through appropriate positioning of the combiner valve 58 by the processor 60 as indicated by the step 224. If it is sufficient, the combiner valve is maintained in a closed position and the bypass valve is positioned appropriately as shown in a step 238. Similar to the above, if the full lift pump assistance in combination with the tilt pump is not sufficient to meet demand, the hydraulic power of the drivetrain can then be employed. If it is sufficient, valve positions are maintained.

If, in the alternative, neither the tilt function, nor the lift function, are being called upon, both the combiner valve 58 is closed and the lift and tilt bypass valves 52 and 54 are opened until such time when such motion is required as indicated by a step 240.

Here, it is important to note that as control of the hydraulic system 20 is automated by the processor 60, a multiple control or feedback loops can be implemented, wherein even after the initial optimization schedule is calculated and implemented, the power directed to the respective cylinders can be continually monitored and, if not meeting the demand, recalculated again. For example, a position sensor could be used to monitor the position of the bucket and if not in the necessary position a corresponding signal can be generated and communicated to the processor 60 to make the necessary correction to the optimization of the load sharing arrangement. Similarly, a pressure sensor within the cylinders could be used.

INDUSTRIAL APPLICABILITY

From the foregoing, it can be seen that the technology disclosed herein has industrial applicability in a variety of settings such as, but not limited to, earth moving vehicles. Often times, such vehicles employ multiple hydraulic cylinders that are called upon to work in concert. As opposed to prior art approaches that allow only one cylinder to be powered at a time, or a very limited cross-modulation, the present invention sets forth a hydraulic system that enables multiple cylinders to be simultaneously powered and moved independently.

This approach has significant applicability in earth-moving vehicles such as loaders. By providing a load-sharing apparatus and system, the lift and tilt cylinders of the loader can be simultaneously moved. This in turn makes loader operations, such as digging, easier and more efficient. The efficiency is gained by getting the same work done in the shorter amount of time. This is enabled by hydraulic circuit arrangements, as described before by applying power management and digging algorithms described in the application.

In other settings, the present disclosure has industrial applicability in any vehicle or machine having multiple hydraulic cylinders which need to work, or which would benefit from working, simultaneously.

What is claimed is:

1. A hydraulic system, comprising:
- a first hydraulic cylinder;
- a second hydraulic cylinder;
- a first hydraulic pump operatively associated with the first hydraulic cylinder;
- a second hydraulic pump operatively associated with the second hydraulic cylinder;
- a combiner valve adapted to allow and disallow fluid communication between the first pump and the second hydraulic cylinder and the second pump and the first hydraulic cylinder;
- at least one bypass valve operable to direct fluid exiting from the first and the second hydraulic pumps to a tank, the at least one bypass valve capable of operating when at least one control valve is in neutral; and
- a processor capable of receiving signals indicative of tasks being called for and generating signals for controlling at least one of the first and second hydraulic pumps, the combiner valve, the at least one bypass valve and the at least one control valve based upon a combination of modified flow, regeneration flow and flow prioritization.

2. The hydraulic system of claim 1, wherein the tasks being called for includes at least one of digging and tilting.

3. The hydraulic system of claim 1, wherein the at least one control valve includes a first control valve between the first hydraulic pump and the first hydraulic cylinder.

4. The hydraulic system, of claim 3, wherein the at least one control valve includes a second control valve between the second hydraulic pump and the second hydraulic cylinder.

5. The hydraulic system of claim 3, wherein the at least one bypass valve includes a first bypass valve between the first control valve and the tank.

6. The hydraulic system of claim 4, wherein the at least one bypass valve includes a second bypass valve between the second control valve and the tank.

7. The hydraulic system of claim 1, wherein the combiner valve is adapted to vary hydraulic flow directed between the first cylinder and the second cylinder from fully dedicated to the first cylinder to fully dedicated to the second cylinder with multiple splits therebetween.

8. An earth moving vehicle, comprising:
- a chassis;
- an engine supported on the chassis;
- a locomotive undercarriage supporting the chassis;
- a first hydraulic cylinder operatively connected to the vehicle;
- a second hydraulic cylinder operatively connected to the vehicle;
- a first hydraulic pump operatively associated with the first hydraulic cylinder;
- a second hydraulic pump operatively associated with the second hydraulic cylinder;
- a combiner valve adapted to allow and disallow fluid communication between the first pump and the second hydraulic cylinder and the second pump and the first hydraulic cylinder;
- at least one bypass valve operable to direct fluid exiting from the first and the second hydraulic pumps to a tank, the at least one bypass valve capable of operating when at least one control valve is in neutral; and a processor capable of receiving signals indicative of tasks being called for and generating signals for controlling at least one of the first and second hydraulic pumps, the combiner valve, the at least one bypass valve and the at least one control valve based upon a combination of modified flow, regeneration flow and flow prioritization.

9. The earth moving vehicle of claim 8, wherein the earth moving vehicle is a loader.

10. The earth moving vehicle of claim 9, wherein the loader is a wheel loader.

11. The earth moving vehicle of claim 8, wherein the first hydraulic cylinder is associated with a lift arm of the vehicle.

12. The earth moving vehicle of claim 8, wherein the second hydraulic cylinder is associated with an implement of the vehicle.

13. The earth moving vehicle of claim 8, wherein the combiner valve is adapted to vary hydraulic flow between the first cylinder and the second cylinder from fully dedicated to the first cylinder to fully dedicated to the second cylinder with multiple splits therebetween.

14. The earth moving vehicle of claim 8, wherein the tasks being called for include at least one of digging and tilting.

15. A method of controlling a hydraulic system for a loader, comprising:

providing a lift hydraulic pump;

providing a tilt hydraulic pump;

providing at least one bypass valve operable to direct fluid exiting from the lift and the tilt hydraulic pumps to a tank, the at least one bypass valve capable of operating when at least one control valve is in neutral;

providing a processor capable of receiving signals indicative of digging and tilting, and generating signals for controlling at least one of the lift and tilt hydraulic pumps, the at least one bypass valve and the at least one control valve;

calculating whether a digging function is being performed;

dedicating flow from the lift pump to a lift cylinder and from the tilt pump to a tilt cylinder when it is determined that the digging function is being performed; and determining whether a combiner valve is to be used if the digging function is not being performed, the determination to use the combiner valve based upon a combination of modified flow, regeneration flow and flow prioritization.

16. The method of claim 15, allowing cross-flow between the lift pump and the tilt cylinder and the tilt pump and the lift cylinder by using the combiner valve when it is determined that the digging function is not being performed and when there is a need for extra flow.

17. The method of claim 15, reducing power to a drivetrain of the loader when digging is being performed and a pressure within at least one of the cylinders exceeds a predetermined threshold.

18. The method of claim 15, wherein the dedicating step is performed by closing a combiner valve.

19. The method of claim 16, wherein the allowing cross-flow step is performed by opening the combiner valve.

20. The method of claim 15, closing the at least one bypass valve when the digging function is being performed or when lifting/tilting functions are being performed.

* * * * *